United States Patent [19]

Moore et al.

[11] Patent Number: 4,489,667
[45] Date of Patent: Dec. 25, 1984

[54] SURFACE EFFECT SHIP SEALS

[75] Inventors: Robert G. Moore; Anthony Y. Simpson, both of Slidell; Howard W. Keefe, New Orleans, all of La.

[73] Assignee: Textron Inc, Providence, R.I.

[21] Appl. No.: 457,720

[22] Filed: Jan. 13, 1983

[51] Int. Cl.³ .............................................. B63B 1/38
[52] U.S. Cl. ................................ 114/67 A; 180/126; 180/128
[58] Field of Search ...... 114/67 A; 180/121, 126–128; 267/64, 27, 113, 122, 140.1

[56] References Cited

U.S. PATENT DOCUMENTS 3,536,156 10/1970 Crago .................................. 180/127
4,090,459 5/1978 Chaplin ............................. 114/67 A Primary Examiner—Sherman D. Basinger
Attorney, Agent, or Firm—Bean, Kauffman & Bean

[57] ABSTRACT

There is disclosed in a multiple lobe air cushion seal system an auxiliary air inflated bounce damping lobe interfacing the cleft between the lower ends of the two lowermost lobes of the system.

11 Claims, 7 Drawing Figures

Fig. 1.
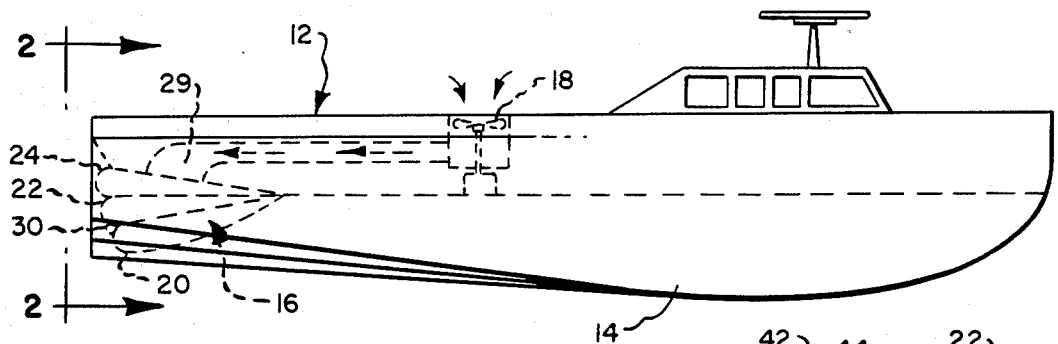
Fig. 2.
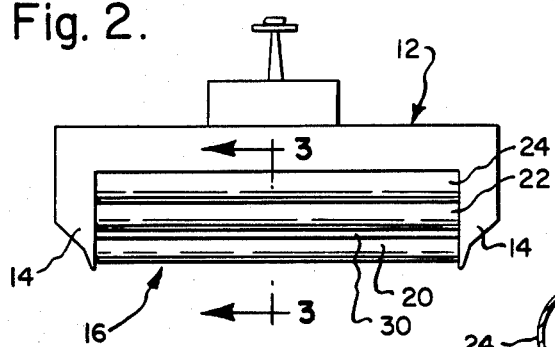
Fig. 4.
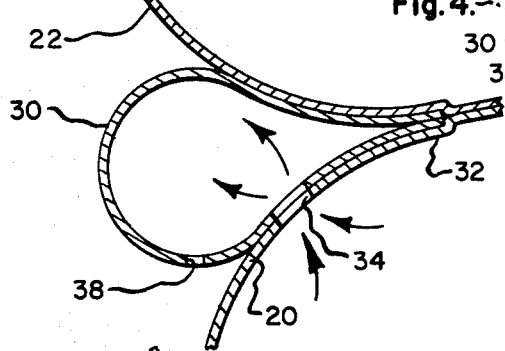
Fig. 5.
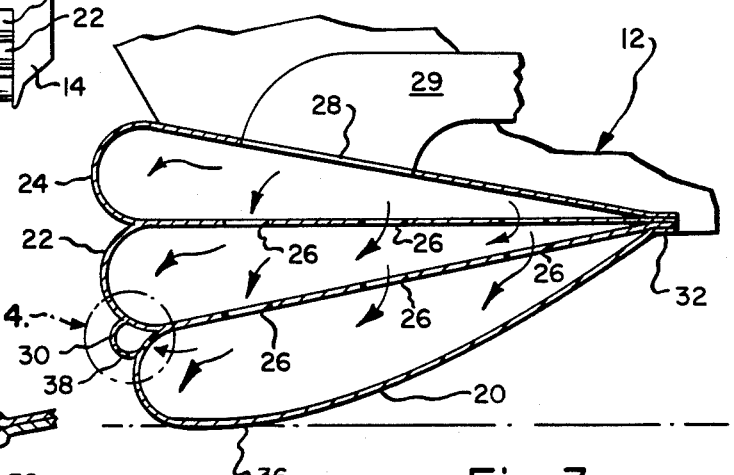
Fig. 3.
Fig. 6.
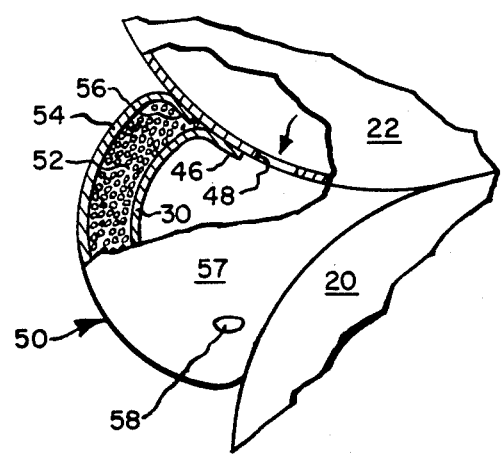
Fig. 7.

4,489,667

SURFACE EFFECT SHIP SEALS

BACKGROUND AND OBJECTS OF THE INVENTION

This invention relates to air cushion supported vehicles, and more particularly to marine vessels of such type which are sometimes referred to as surface effect ships ("SES"). Specifically, the invention relates to air cushion seals comprising one or more inflatable bags or "lobes", such as may be used at the stern of a "SES" to extend between the sidehulls or skegs of the ship as shown for example in U.S. Pat. Nos. 3,977,491; 4,090,459; 4,137,987; 4,303,034 and 4,333,413. Also, such seals may be employed at the bow of the ship as well as between air cushion space partitioning keels or skegs or the like for stability improvement purposes, such as shown for example at 18,20 in U.S. Pat. No. 4,090,459.

Such inflatable seals may comprise any number of such lobes arranged in superposed relation. In any case, the seal device is hingedly affixed at its forward end to the hull structure so as to bridge the air cushion space beneath the ship; the major body portion thereof being thereby suspended to provide an inclined hanging curtain riding at its bottom upon the water surface over which the ship is operating for maintaining the air cushion support under the vessel.

The recent development and advent of relatively high speed operating vessels of this type has presented a new problem to the art in that such seal structures are now called upon to have much more rapid responses to the more rapidly encountered variations in the contours of the water surface over which the vessel is travelling. Relatively non-compliant seal structures such as have been previously successful are in this case subjected to unacceptable "snap-back" and "slamming" loads on the seal structure and drag forces on the ship operation. Thus, to accommodate varying sea state conditions it is therefore required that the seal structure in a high speed surface effect ship be relatively lightweight and versatile as to its ability to adequately function in accordance with its primary purpose, while at the same time being structurally competent to withstand the impacts and dynamic loads imposed upon the structure under high speed operating and severe sea state conditions.

The present invention provides an improvement as to prior art approaches to this problem, whereby such prior art type relatively lightweight seals which are prone to undesirably vibrate and bounce on the surface of of the water when operating at high speeds over rough water may be modified to perform as required. This tendency to "bounce" upon the water surface is due to the "throttling" effect which takes place between the seal structure and the water surface in accordance with the well known Bernoullis theorem. Furthermore, the bouncing oscillation tendencies of the lowermost lobe in a seal construction of this type versus the water surface induce the so-called "Coanda effect" which operates on the lowermost lobe of the seal. Thus, the lowermost lobe of the seal is prone to vibrate and bounce on the surface of the water. Under certain conditions, this motion induces sympathetic motions in the other elements of the seal to such an extent that the natural frequency of the seal is obtained. At this point, the various elements, or lobes of the seal are prone to vibrate and bounce on the surface of the water and to slap together and apart at the natural frequency of the seal. This operates to generate resonate vibrations such as are seriously detrimental to the seal constructions of the prior art, and are discomforting to the ship passengers and crew. This invention provides means to counter such tendencies of relatively lightweight seal structures to vibrate and bounce upon the surface of the water over which the ship is travelling, while still performing its primary air cushion sealing purpose.

THE DRAWINGS

FIG. 1 of the accompanying drawing is a side elevational view of a SES, showing by means of broken lines employment therein of a stern seal assembly of the present invention;

FIG. 2 is a rear end elevational view thereof;

FIG. 3 is a fragmentary sectional view on enlarged scale, taken as along line 3—3 of FIG. 2;

FIG. 4 is a fragmentary enlarged scale sectional view of the lobe damping device of the invention, taken as indicated by the FIG. 4 encircled portion of FIG. 3;

FIG. 5 is a view corresponding to FIG. 4 illustrating an alternate method for attachment of the damping device;

FIG. 6 is a fragmentary sectional view taken as along line 6—6 of FIG. 5; and

FIG. 7 is a fragmentary end elevational view, partly broken away to correspond to FIGS. 4 and 5 to show still another method for attachment of the bounce control lobe to the primary seal lobes; as well as to show a further modified form of construction for the bounce control loop.

DETAILED SPECIFICATION

As shown at FIGS. 1 and 3, the invention may be embodied in a generally conventional type surface effect ship having a main structure or platform 12 which is buoyantly supported relative to a body of water by means of opposite sidehulls 14—14. To enable the ship to operationally ride substantially higher upon a cushion of air, the sidehulls are bridged at the bow end of the ship by means of a bow seal device (not shown) and at the stern end of the ship by means of a seal device (shown generally at 16) of the present invention which extends laterally between the stern ends of the hulls 14—14. Thus, as shown in the above referenced patents, the space beneath the ship platform 12 is adapted to confine a cushion of air for partially raising the ship out of water whenever a suitable supply of compressed air (or other gas) is furnished thereto, such as by means of blowers 18 or the like, as is well known in the art.

Whereas the invention is illustrated and further described in detail herein as being embodied in a stern seal comprising an operating laminate of three lobes 20,22,24, it is to be understood that the invention may provide a seal operating structure comprising only two or more such superposed lobes. The invention may similarly be embodied in a bow seal for the vessel and/or substituted for an intermediately disposed seal system for purposes such as are shown in U.S. Pat. No. 4,090,459. The lobes may be either of the fully opened-end, fully closed-end or closed-end perforated type as shown for example in U.S. Pat. No. 4,090,459. In any case, the lobes are formed of flexible air-impervious sheet material having intercommunicating air passages such as shown at 26 through the dividing partitions thereof, and an opening 28 through the uppermost lobe wall for receiving pressurized air by way of a conduit 29 leading from the blower 18 (FIGS. 1 and 3). The leading edge portions of the lobes are fixedly attached such as at 32 (FIG. 1) to the ship platform structure 12.

In accordance with this invention, a seal bounce control loop as shown at 30 is provided as an adjunct to lengthwise encompass the split between the two lowermost lobes 20,22 at the aft end of the seal structure, and is arranged to be inflated by air supplied from the primary loop system. As shown for example at FIG. 4, the loop 30 may be provided by a sectionally pear-shaped sheet of material, anchored at its co-joined leading edges as shown at 32 (as by cementing or stitching or the like) to the adjacent sheet portions of the lobes 20,22. Air supply apertures such as shown at 34 are furnished to transfer air from either lobe 20 or lobe 22 into the lobe 30. As shown at 36 (FIG. 3) and at 38 (FIG. 4) water drainage apertures are provided through the bottom wall surfaces of the lobes 20,30 respectively. The bounce control loop 30 may be either of the fully open-end; fully closed-end, or closed-end perforated type; as in the case of the primary seal lobes. Selection of the preferred type will depend upon the bounce control loop working pressure desired.

FIG. 5 corresponds to FIG. 4 but illustrates an alternative method for attachment of the leading edges of the bounce control lobe 30 to the lobes 20,22. As shown at 40, a single lobe partitioning sheet 42 is sandwiched between the leading edges of the lobe 30 and affixed thereto. As best shown at FIG. 6, the partition sheet 42 is corrugated or otherwise deformed so as to provide air transfer openings 44 between the leading edges of the fabric of loop 30, for air supply to the loop 30. FIG. 7 illustrates still another suitable method for constructing the improved seal structure, wherein the lobe sheet 30 is configured to be of sectionally C-shaped form and is lapped and adhesively or otherwise attached along its leading edges as shown at 46—46 to the lobes 20,22. In this case, the bounce control loop 30 is inflated by air supplied through apertures 48 which may be either as shown herein through the wall of lobe 22, or through the wall of lobe 20.

FIG. 7 also illustrates another preferred construction of the anti-bounce loop of the invention wherein it is of "sandwich" form comprising in addition to the basic wall portion 30 of the loop a "wrapper" 50 of foamed elastomeric material 52 which is provided to encircle the basic loop 30. The foam material as shown in enclosed within a flexible cover sheet 54 of suitably rugged elastomeric material which is lapped upon and adhesively attached as shown at 56 along its opposite edges to the primary lobes 20,22. The foam insert 52 is provided of sufficient thickness to increase the bending stiffness and added mass to the bounce control lobe to furnish the desired additional bounce damping facility. In this case, if the bounce control lobe is capped and fully or partially closed as shown at 57, water drainage means may be provided through the opposite end caps 57 thereof as shown at 58 (FIG. 7).

It has been found that addition of a "bounce control" loop as shown and described operates as an effective seal component slam/snap-back vibration damping facility for high speed surface effect ships. For optimum damping performance, regulation of the pressurizations of the bounce control loop vis-a-vis pressurizations of the adjacent primary seal loops may be acquired by adjusting the relative sizings of the inter-lobe air transfer apertures and selecting the type and proximity of the ends of the bounce control loop to the inner walls of the ship's sidehulls to suit various operational requirements. For example, the bounce control lobe in either form as shown in FIGS. 4–7 inclusive, may be of the fully or partially closed-end type, or may be of the fully-open end type and lengthwise dimensioned so as to terminate at its opposite ends short of the inner walls of the sidehulls 14,14 of the vessel. In this case, the sizings of the air supply apertures providing inlet of air to the bounce control lobe and the distances of the open ends of the lobe from the ship sidehulls may be so relatively regulated as to attain optimum bounce control for a variety of SES stern seal constructions of the invention differing dimensionally and functionally from one another.

We claim:

1. In a seal structure for controlling maintenance of a cushion of air under a vessel capable of travelling over an irregular water surface at high speeds; said structure comprising primarily a laminate of air-inflated pillow-like lobes fabricated of flexible, air impervious sheet material defining a partition sheet means providing a boundary between adjacent lobes and bulbous aft portions, wherein the bulbous aft portion of each lobe depends from and is supported by the bulbous aft portion of an adjacent upper lobe and cooperates therewith to define a cleft therebetween and said partition sheet means has leading portions thereof fixed to said vehicle and aft portions thereof fixed to said bulbous aft portions at each said cleft, whereby when operating over irregular water surfaces the bulbous aft portion of the lowermost primary lobe of said seal structure is prone to bounce upon said water surface and alternately slam against and snap back relative to the bulbous aft portion of the next above lobe of said structure; the improvement comprising:

providing an air-inflated bounce damping lobe bridging in interfacing relationship the cleft between the bulbous aft portions of the two lowermost lobes of said seal structure; said bounce damping lobe being attached at its leading edge portions to said two lowermost lobes.

2. A seal structure as set forth in claim 1 wherein said bounce damping lobe is supplied with inflating air by air supply aperture means leading thereinto from at least one of said two lowermost lobes, and is provided with a water drainage aperture means extending through a lower level wall portion thereof outwardly of said two lowermost lobes.

3. A seal structure as set forth in claim 2 wherein the sizings of said air supply aperture means and said water drainage aperture means are so relatively regulated as to attain optimum seal bounce control performance by said damping lobe.

4. A seal structure as set forth in claim 1 wherein said bounce damping lobe is formed of a sheet of flexible air-impervious material into a sectionally pear-shaped configuration and the leading edges thereof are sandwiched between and affixed to adjacent wall portions of said two lowermost lobes at the juncture of said bulbous aft portions thereof.

5. A seal structure as set forth in claim 1 wherein said bounce damping lobe is formed of flexible air-impervious sheet material into a C-shaped configuration and the leading edges thereof are separately affixed to said bulbous aft portions of said two lowermost lobes.

6. A seal structure as set forth in claim 1 wherein said bounce damping lobe is formed of flexible air-impervious sheet material into a sectionally pear-shaped configuration with the leading edges thereof sandwiched between and affixed to adjacent wall portions of said two lowermost lobes at the juncture of said bulbous aft portions thereof, said leading edges enclosing therebetween said partition sheet means comprising a common wall portion of and separating said two lowermost lobes; and said partition sheet means is shaped to define aperture means providing for supply of inflating air to said bounce damping lobe from at least one of said two lowermost lobes.

7. A seal structure as set forth in claim 1 wherein said bounce damping lobe is of composite construction, comprising a layer of foamed elastomeric material sandwiched between sheets of flexible covering material having leading edges affixed to said two lowermost lobes.

8. A seal structure as set forth in claim 7 wherein the opposite ends of said damping lobe are closed by sheet members having water drainage apertures therethrough.

9. A seal structure as set forth in claim 7 wherein said bounce damping lobe is supplied with inflating air by aperture means leading thereinto from one of said two lowermost lobes, and the opposite ends of said damping lobe are open and spaced away from the walls of the sidehulls of the vessel.

10. A seal structure as set forth in claim 7 wherein said bounce damping lobe is of C-shaped configuration and the leading edges of said sheets of flexible covering material are affixed to said bulbous aft portions of said two lowermost lobes.

11. A seal structure as set forth in claim 1 wherein said bounce damping lobe is supplied with inflating air by aperture means leading thereinto from one of said two lowermost lobes, and the opposite ends of said damping lobe are open and spaced away from the walls of the sidehulls of the vessel.

* * * * *